(12) United States Patent
Poggi et al.

(10) Patent No.: US 9,680,741 B2
(45) Date of Patent: Jun. 13, 2017

(54) METHOD OF OPERATING A SWITCH OR ACCESS NODE IN A NETWORK AND A PROCESSING APPARATUS CONFIGURED TO IMPLEMENT THE SAME

(75) Inventors: Fabio Poggi, Genoa (IT); Davide Grillo, Savona (IT); Luca Risso, Genoa (IT); Daniele Scali, Genoa (IT); Adolfo Turchetti, Genoa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 55 days.

(21) Appl. No.: 14/425,364

(22) PCT Filed: Sep. 4, 2012

(86) PCT No.: PCT/EP2012/067186
§ 371 (c)(1),
(2), (4) Date: Mar. 3, 2015

(87) PCT Pub. No.: WO2014/037028
PCT Pub. Date: Mar. 13, 2014

(65) Prior Publication Data
US 2015/0222538 A1 Aug. 6, 2015

(51) Int. Cl.
*H04W 4/00* (2009.01)
*H04L 12/721* (2013.01)
(Continued)

(52) U.S. Cl.
CPC .......... *H04L 45/72* (2013.01); *H04L 12/6418* (2013.01); *H04L 61/6009* (2013.01);
(Continued)

(58) Field of Classification Search
CPC ... H04L 45/72; H04L 63/164; H04L 61/6009; H04L 63/0236
(Continued)

(56) References Cited

U.S. PATENT DOCUMENTS

2007/0195804 A1* 8/2007 Ijima .................. H04L 12/2856
370/401
2009/0282152 A1 11/2009 Zhang et al.
(Continued)

OTHER PUBLICATIONS

In: McQuerry, S.: Interconnecting Cisco Network Devices (XP-002695500), Feb. 2008.
(Continued)

*Primary Examiner* — Farah Faroul
(74) *Attorney, Agent, or Firm* — Baker Botts, LLP

(57) ABSTRACT

There is provided a method of operating a switch (10; 22) or an access node (20) in a network (2; 12), the switch or access node having a plurality of interfaces (64) through which data packets (30) can be received and forwarded, the network (2; 12) further comprising one or more gateway nodes (6; 16) and one or more user terminals (4; 14), each of the gateway nodes and the user terminals having a respective address, the method in the switch or access node comprising identifying the address for at least one of the gateway nodes (101); comparing a source address (32) specified in a data packet received from a user terminal at one of the interfaces of the switch or access node to the identified addresses for the one or more gateway nodes (103, 105); storing the source address specified in the data packet and the identity of the interface through which the data packet was received if the source address specified in the data packet does not match an address for any of the one or more gateway nodes (107); and discarding the data packet if the source address specified in the data packet matches an address for any of the one or more gateway nodes (111).

17 Claims, 4 Drawing Sheets

(51) Int. Cl.
  *H04L 29/06* (2006.01)
  *H04L 12/64* (2006.01)
  *H04L 29/12* (2006.01)

(52) U.S. Cl.
  CPC ...... *H04L 63/0236* (2013.01); *H04L 63/1466* (2013.01); *H04L 63/164* (2013.01)

(58) Field of Classification Search
  USPC .................................................. 370/389, 392
  See application file for complete search history.

(56) References Cited

U.S. PATENT DOCUMENTS

| | | | | |
|---|---|---|---|---|
| 2010/0020809 A1* | 1/2010 | Jones | .................. | H04L 12/4645 370/395.53 |
| 2010/0287304 A1* | 11/2010 | Chanda | .............. | G06F 9/45533 709/236 |
| 2012/0047573 A1* | 2/2012 | Duncan | ............ | H04L 29/12915 726/13 |
| 2012/0082161 A1* | 4/2012 | Leung | ................ | H04L 12/4633 370/392 |
| 2012/0163376 A1* | 6/2012 | Shukla | .................. | H04L 12/413 370/388 |
| 2013/0259061 A1* | 10/2013 | Aoshima | ................ | H04L 12/66 370/401 |
| 2013/0332586 A1* | 12/2013 | Masputra | .............. | H04L 69/167 709/220 |
| 2014/0192810 A1* | 7/2014 | Hikichi | ................. | H04L 45/126 370/392 |
| 2014/0195666 A1* | 7/2014 | Dumitriu | ............ | H04L 12/4625 709/223 |
| 2015/0222543 A1* | 8/2015 | Song | .................. | H04L 12/4641 370/392 |

OTHER PUBLICATIONS

Technical Report; DSL Forum TR-101; Migration to Ethernet-Based DSL Aggregation; Produced by: Architecture and Transport Working Group, Apr. 2006.

Broadband Forum; Technical Report; TR-177; IPv6 in the context of TR-101; Issue 1, Issue Date Nov. 2010.

International Search Report for PCT/EP2012/067186, Apr. 26, 2013.

* cited by examiner

| MAC address | Input port |
|---|---|
| MAC A | zz |
| MAC X | xx |

| Gateway node MAC address | Lifetime |
|---|---|
| MAC X | tt |

METHOD OF OPERATING A SWITCH OR ACCESS NODE IN A NETWORK AND A PROCESSING APPARATUS CONFIGURED TO IMPLEMENT THE SAME

PRIORITY

This nonprovisional application is a U.S. National Stage Filing under 35 U.S.C. §371 of International Patent Application Serial No. PCT/EP2012/067186, filed Sep. 4, 2012 and entitled "A Method Of Operating A Switch Or Access Node In A Network And A Processing Apparatus Configured To Implement The Same."

TECHNICAL BACKGROUND

The invention relates to switches and/or access nodes for use in a network, and in particular to a method of operating the switch and/or access node to improve the security of the network.

BACKGROUND

In an Ethernet network, each network node, such as a user terminal, a gateway node, a switch or an access node, has an associated address (known as a MAC address). All data packets (Ethernet frames) transmitted through the Ethernet network include information indicating the address of the source of the data packet (e.g. the source MAC address) and the address of the destination (e.g. the destination MAC address).

Each of the switches and access nodes in the network that connect the user terminals and gateway nodes together has a number of interfaces (ports) into which the user terminals, gateway nodes and/or other switches and/or access nodes can be connected. A switch or access node reads the destination address specified in any data packet it receives and forwards the data packet through the appropriate interface.

In order for the switches and access nodes to be able to forward data packets through the correct interface, each of the switches and access nodes in the network performs a learning process as they operate in order to associate the addresses of the user terminals and gateway nodes with a particular interface in the switch or access node.

In this learning process, whenever the switch or access node receives a data packet, it reads the source address (i.e. the address of the source node of that data packet) and stores that address along with the identity of the interface in the switch or access node through which the data packet was received. This information is used by the switch or access node to identify the interface through which data packets addressed to that node should be sent. Over time, the switch or access node therefore builds up a 'map' of which interfaces connect to which addresses (i.e. nodes) in the network and is used by the switch or access node to forward any received data packets through the appropriate interface to the specified destination node.

If the structure of the network is changed (for example a user terminal is connected to a different interface in the switch or access node or a different switch or access node altogether), the address-interface pair stored by the switch or access node will be updated as soon as it receives a new data packet from that user terminal (which will specify the address of the user terminal in the source part of the packet).

One significant problem with this learning process is that it is not controlled. That is, any source address specified in a data packet received at a particular interface of the switch or access node will be stored by the switch or access node; no verification of the accuracy or authenticity of the specified source address is performed by the switch or access node.

This means that, for example, a user terminal could transmit a data packet specifying the address of a gateway node in the source address portion of the data packet which will cause the switches and access nodes through which the data packet passes to update the identity of the interface with which the address of the gateway node is associated to correspond to the interface to which the user terminal is connected. This means that the switch or access node will forward future data packets addressed to the gateway node through the interface towards the user terminal. In this scenario, the user terminal effectively pretends to be the gateway node by 'stealing' its address in order to receive traffic intended for the gateway node. This is clearly undesirable.

Two solutions have been proposed to deal with this problem. One solution prevents the learning process from operating on any address that is specified in a data packet received through a different interface to one that has already been learnt. In other words, once an address has been associated with a particular interface, the switch or access node will not subsequently associate that address with another interface. However, this solution means that it is not possible for the user terminal to move around the network and to connect to different interfaces of the switches or access nodes (or different switches or access nodes altogether).

The second solution requires each interface of a switch or access node to be configured with a 'learning priority' with the result that an address learnt on a 'low' priority interface (which might be connected to user terminals rather than gateway nodes) can be learnt on a 'high' priority interface (which might be connected to gateway nodes rather than user terminals), but an address learnt on a 'high' priority interface cannot be learnt on a 'low' priority interface. However, this solution does not allow types of user terminals to be distinguished (e.g. between user computers, laptops, etc. and network servers).

SUMMARY

Therefore, there is a need for an improved method of operating a switch or access node in a network to improve the security of the network, and in particular to prevent a user terminal from 'stealing' or making use of the address of another node in the network.

According to a first aspect, there is provided a method of operating a switch or an access node in a network, the switch or access node having a plurality of interfaces (64) through which data packets can be received and forwarded, the network further comprising one or more gateway nodes and one or more user terminals, each of the gateway nodes and the user terminals having a respective address, the method in the switch or access node comprising identifying the address for at least one of the gateway nodes; comparing a source address specified in a data packet received from a user terminal at one of the interfaces of the switch or access node to the identified addresses for the one or more gateway nodes; storing the source address specified in the data packet and the identity of the interface through which the data packet was received if the source address specified in the data packet does not match an address for any of the one or more gateway nodes; and discarding the data packet if the source address specified in the data packet matches an address for any of the one or more gateway nodes.

The method preferably further comprises the step of forwarding the data packet to a destination address specified in the data packet if the source address specified in the data packet does not match an address for any of the one or more gateway nodes.

The step of discarding the data packet preferably comprises discarding the data packet such that the data packet is not forwarded to a destination address specified in the data packet.

The step of discarding the data packet also or alternatively comprises discarding the data packet such that the source address specified in the data packet and the identity of the interface through which the data packet was received is not stored at the switch or access node.

Preferably, the step of identifying the address for at least one of the gateway nodes comprises analysing data packets received at the switch or access node to identify those data packets that have been transmitted by a gateway node.

Preferably, the step of identifying the address for at least one of the gateway nodes comprises storing a source address specified in any data packet identified as having been transmitted by a gateway node as an address of a gateway node.

In some embodiments, the step of analysing data packets received at the switch or access node comprises inspecting the received data packets for IPv6 messages.

In other embodiments, the step of analysing the data packets comprises inspecting the received data packets one or more messages selected from Dynamic Host Control Protocol version 6, DHCPv6 messages; Neighbour Discovery Protocol, NDP, messages; or Internet Control Message Protocol version 6, ICMPv6, messages.

In particular embodiments, the switch or access node is for use in an Ethernet network, the data packet is an Ethernet frame and the address is a MAC address.

According to a second aspect, there is provided a processing apparatus for use in a switch or access node in a network, the network comprising one or more gateway nodes and one or more user terminals, each of the gateway nodes and the user terminals having a respective address, the processing apparatus comprising a plurality of interfaces through which data packets can be received and forwarded; a memory module; and a control unit configured to identify the address for at least one of the gateway nodes; compare a source address specified in a data packet received from a user terminal at one of the plurality of interfaces to the identified addresses for the one or more gateway nodes; store the source address specified in the data packet and the identity of the interface through which the data packet was received in the memory module if the source address specified in the data packet does not match an address for any of the one or more gateway nodes; and discard the data packet if the source address specified in the data packet matches an address for any of the one or more gateway nodes.

The control logic is preferably further configured to forward the data packet to a destination address specified in the data packet through one of the plurality of interfaces if the source address specified in the data packet does not match an address for any of the one or more gateway nodes.

The control logic is preferably configured to discard the data packet such that the data packet is not forwarded to a destination address specified in the data packet.

The control logic is also or alternatively configured to discard the data packet such that the source address specified in the data packet and the identity of the interface through which the data packet was received is not stored in the memory module.

The control logic is preferably configured to identify the address for at least one of the gateway nodes by analysing data packets received at the plurality of interfaces to identify those data packets that have been transmitted by a gateway node.

The control logic is preferably configured to identify the address for at least one of the gateway nodes by storing a source address specified in any data packet identified as having been transmitted by a gateway node as an address of a gateway node.

In some embodiments, the control logic is configured to analyse data packets received at the plurality of interfaces by inspecting the received data packets for IPv6 messages.

In other embodiments, the control logic is configured to analyse data packets received at the plurality of interfaces by inspecting the received data packets for messages selected from Dynamic Host Control Protocol version 6, DHCPv6, messages; Neighbour Discovery Protocol, NDP, messages; or Internet Control Message Protocol version 6, ICMPv6, messages.

In particular embodiments, the switch or access node is for use in an Ethernet network, the data packet is an Ethernet frame and the address is a MAC address.

According to a third aspect, there is provided a switch or access node comprising a processing apparatus as described above.

According to a fourth aspect, there is provided a network comprising one or more switches and/or access nodes as described above.

According to a fifth aspect, there is provided a computer program product comprising computer readable code embodied therein, the computer readable code being configured such that, on execution by a processor, the processor performs the method described above.

BRIEF DESCRIPTION OF THE DRAWINGS

Embodiments of the invention will now be described, by way of example only, with reference to the following drawings, in which.

DETAILED DESCRIPTION

Although the invention will be described below with reference to nodes an Ethernet network, it will be appreciated that the invention can be applied to nodes for use in other types of networks that make use of a learning process to map addresses to ports or interfaces of the nodes.

Figure 1:
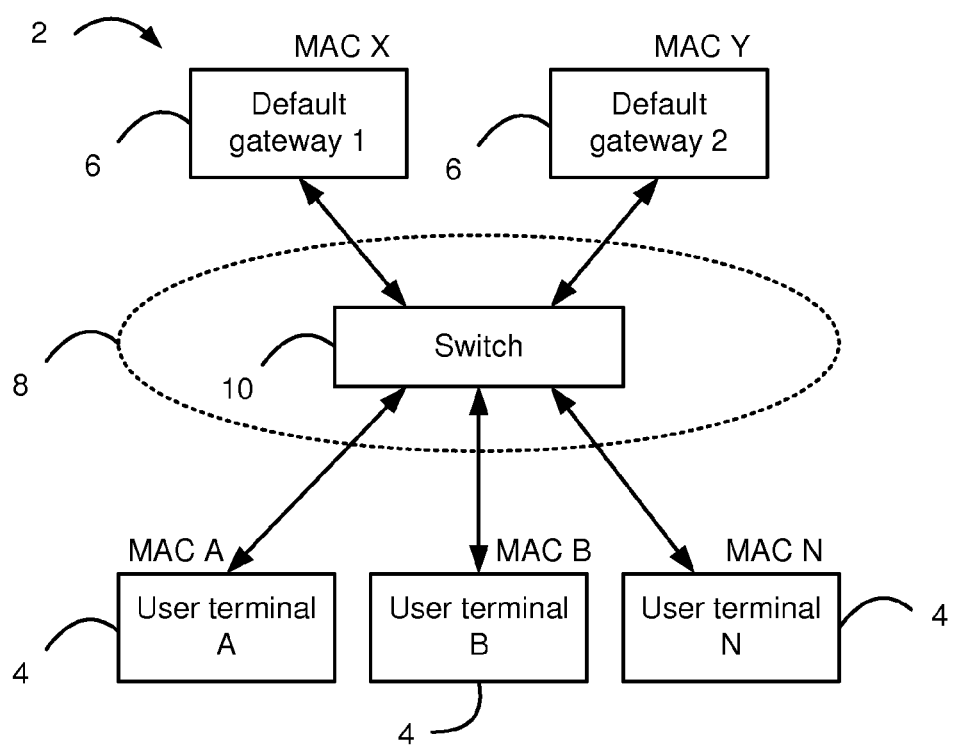
FIG. 1 is a block diagram of a network in which the invention can be implemented.

An exemplary network according to an embodiment is shown in FIG. 1. The network 2 comprises a plurality (N) of user terminals 4, which may be computers, laptops, printers, servers, etc. that are connected to one or more gateway nodes 6 (e.g. a default gateway or router) via an Ethernet network 8. The gateway nodes 6 can connect the user terminals 4 to other networks, such as the Internet.

In FIG. 1, the Ethernet network 8 is shown as comprising a switch 10 which has a number of interfaces into which each of the user terminals 4 and gateway nodes 6 are connected. It will be appreciated that in practice the network 8 may comprise a plurality of switches 10 each interconnected in such a way as to enable a data packet sent from any user terminal 4 or gateway node 6 to reach any other user terminal 4 or gateway node 6 in the network 2. Each of the nodes 4, 6, 10 in the network 2, including the user terminals 4 and the gateway nodes 6, has a respective address (known as a MAC address in Ethernet networks).

Figure 2:
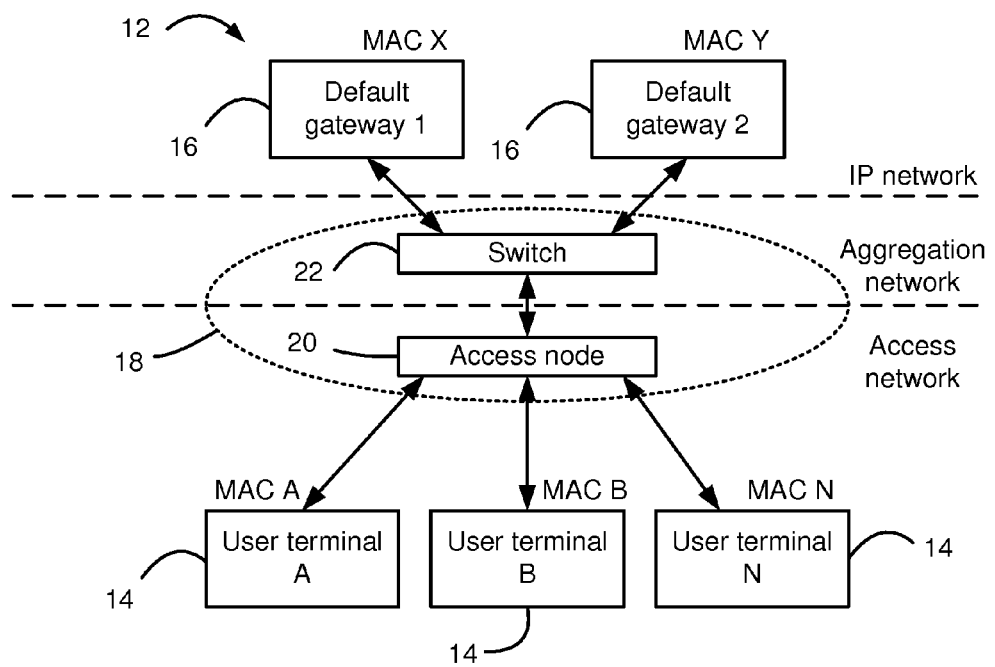
FIG. 2 is a block diagram of an alternative type of network in which the invention can be implemented.

An alternative network 12 according to a second embodiment is shown in FIG. 2. This network 12 comprises a plurality of user terminals 14, such as computers, laptops, printers, servers, etc. that are connected to one or more gateway nodes 16 via an Ethernet network 18. The Ethernet network 18 comprises at least one access node 20 connected to at least one switch 22. The Ethernet network 18 is conceptually divided into an access network that contains the access node(s) 22 and an aggregation network that contains the switch(es) 20. The access network encompasses the elements (nodes) of the network from a Network Interface Device (NID) at, for example, a customer premises, to a Broadband Network Gateway. This network typically includes one or more types of access node 20 and may include an Ethernet aggregation function.

The access node 20 may implement a Digital Subscriber Line (DSL) signal termination, it may physically aggregate other nodes, or it may perform both functions at the same time. It can be central office (CO) based or non-CO based equipment.

The access node 20 has at least one 'northbound' interface (for example a standard Ethernet interface) that is connected to the switch 22 and into which it aggregates traffic (data packets) from several Ethernet-based DSL 'southbound' ports to which user terminals 14 can be connected. The access node 20 thus provides access to the network 18 and gateway nodes 16 to the user terminals 14.

It will be appreciated that in practice the network 18 may comprise a plurality of switches 22, and/or a plurality of access nodes 20. As in the network in FIG. 1, each of the nodes 14, 16, 20, 22 in the network 12, including the user terminals 14 and the gateway nodes 16, has a respective address.

Figure 3:
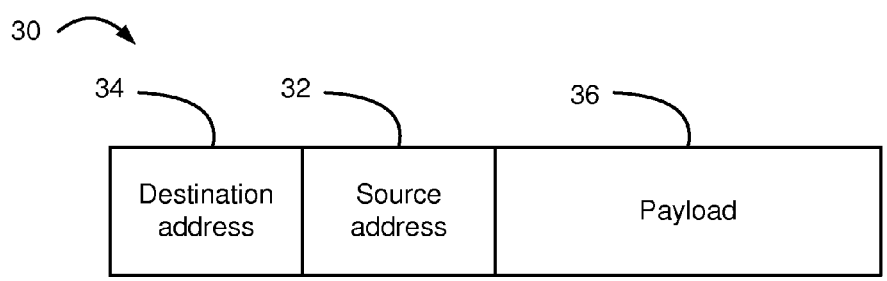
FIG. 3 is an illustration of an exemplary data packet structure.

An exemplary data packet (Ethernet frame) structure is shown in FIG. 3. In this Figure, a data packet (Ethernet frame) 30 is shown as comprising a source address field 32 that indicates the address of the node that originated the data packet 30, a destination address field 34 that indicates the address of the node to which the data packet 30 should be sent, and a payload field 36 that contains the data or message to be provided to the destination node. It will be appreciated that FIG. 3 only shows the fields necessary for illustrating the invention; actual data packets (in particular Ethernet frames) can comprise additional fields to those shown in FIG. 3.

As described above, each of the switch 10, 22 and access node 20 perform a learning process on any data packets they receive to determine the interface associated with each source address (e.g. the address of a user terminal 4, 14 or gateway node 6, 16).

For example, in the network of FIG. 1, consider a user terminal A (having address MAC A) transmitting a data packet 30 to default gateway 1 (having address MAC X). The data packet 30 will specify address MAC A in the source address field 32 and address MAC X in the destination address field 34.

Figures 4, 6, 7:
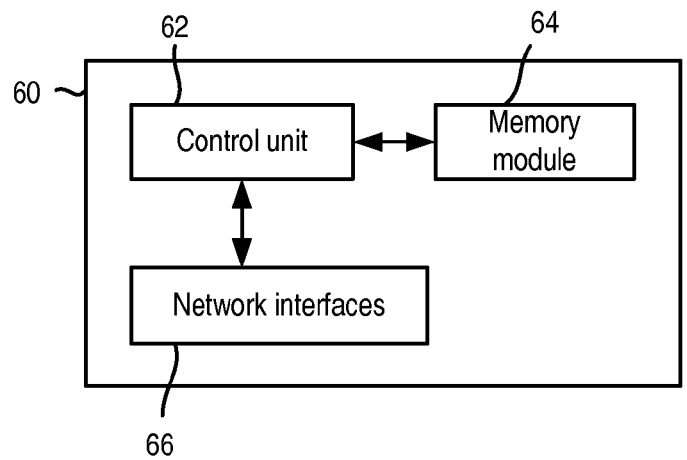
FIG. 4 is an illustration of information obtained by a switch or access node from a learning process.
FIG. 6 is an illustration of gateway node information stored in a switch or access node according to the invention.
FIG. 7 is a block diagram of processing apparatus according to the invention for use in a switch or access node.

The data packet 30 is sent by user terminal A to switch 10, and the switch 10 stores the identity of the interface through which the data packet 30 was received along with the source address (i.e. MAC A) specified in the source address field 34 of the packet 30. The information can be stored in a table in the memory of the switch 10. An exemplary table 40 is shown in FIG. 4. Thus, the table 40 stores the address 42 and the identity of the interface (port) 44 of the switch 10 from which the data packet 30 was received.

The switch 10 then forwards the data packet 30 to default gateway 1 through the appropriate interface of the switch 10 (which may have been learnt earlier from a packet received from default gateway 1).

Any subsequent data packets 30 received by the switch 10 that are addressed to user terminal A (i.e. where MAC A is specified in the destination address field 32) will be forwarded by the switch 10 through the interface learnt earlier and stored in table 40 towards user terminal A.

As described above, there is nothing in conventional networks to prevent user terminal A from specifying address MAC X (which belongs to default gateway 1) in the source address field 32 of any data packets 30 it sends, thereby causing switch 10 to update the entry in table 40 for that address (MAC X) to the interface that the user terminal A is connected to.

However, in accordance with certain embodiments, a method of operating a switch 10, 22 or access node 20 is provided that prevents a user terminal 4, 14 from 'stealing' or making use of the address of a gateway node 6, 16 in a network.

In step 101, the switch or access node identifies the address of one or more of the gateway nodes 6, 16 in the network. In particular embodiments, this step comprises the switch or access node analysing received data packets to identify those packets that have been transmitted by a gateway node. The source address 32 specified in any data packet determined to be sent by a gateway node is stored by the switch or access node for use in subsequent steps of the method. The source address(es) 32 can be stored in a gateway node address table 50, for example as shown in FIG. 6. Each stored address 52 can have an associated 'lifetime' value 54 stored in the table 50 which is refreshed or reset each time that a data packet is received from that gateway node. The lifetime value can be a period of time for which the gateway node address can be considered valid for forwarding decisions.

In some embodiments, step 101 can comprise learning the address of the gateway nodes by inspecting the data packet for the presence of messages that would only be sent by routers or default gateways. Such messages can be protocol messages selected from: DHCPv6 messages; Neighbour Discovery Protocol, NDP, messages; or Internet Control Message Protocol, ICMPv6, messages.

For example, in DHCPv6 there are messages that are expected to originate from the DHCPv6 server like ADVERTISE and REPLY messages. The same applies for ICMPv6 Redirect and Router Advertisement (RA) messages that are only created and transmitted by a router. The way in which the data packets are inspected to identify the packets that have been sent by a gateway node in respect of IPv6-related protocols is described in more detail below.

Where step 101 comprises analysing received data packets, step 101 can be performed on each data packet that is received at the switch or access node.

In additional or alternative embodiments of the invention, the switch or access node can be manually programmed with the addresses of the gateway node or nodes in the network when the switch or access node is installed.

Once the address for one or more gateway nodes has been identified, the gateway node address (or list of gateway node addresses) is used to control the address learning by the switch or access node.

In particular, when a data packet is received from a user terminal, the source address 32 specified in the data packet is compared by the switch or access node to the gateway node address or addresses stored in step 101 (steps 103 and 105).

In step 103, it is possible to know that a data packet has been received from a user terminal by the interface through which the data packet has been received. For example, as described above an access node can have a set of 'southbound' ports that are to be connected to user terminals, and therefore it can be assumed by the access node that a data packet received through any of these ports is from a user terminal. This data packet is then processed as described in step 103. A switch can be configured such that some of its ports or interfaces are labelled as downlink (or 'untrusted' according to the Broadband Forum) and the other port(s) or interface(s) are labelled as uplink (or 'trusted' according to the Broadband Forum), which means that a data packet received through a port labelled as downlink (or untrusted) will be assumed to be from a user terminal and thus be processed as described in step 103.

If the source address 32 for the data packet from a user terminal does not match the address of a gateway node stored in step 101 (and for which the lifetime value, if used, has not expired), then it is considered that the user terminal is not impersonating a gateway node by using its address, and the switch or access node is permitted to perform the usual learning process on the received data packet. This means that the switch or access node will store the address in its address-interface mapping table 40 along with the identity of the interface of the switch or access node over which the data packet was received (step 107), or, if the address is already present in the table 40, update the entry for that address with the identity of the interface over which the data packet was received.

The data packet is then forwarded by the switch or access node to the destination address 34 specified in the data packet (step 109). In particular, the switch or access node looks up the destination address 34 specified in the data packet in the address-interface mapping table 40, and forwards the data packet through the required interface. If there is no entry for the destination address 34 in the mapping table 40, the switch or access node 'floods' the data packet through the network, which means that it forwards the data packet through each of its interfaces.

If at step 105 the source address 32 specified in the data packet received from a user terminal does match the address of a gateway node stored in step 101 (and for which the lifetime value, if used, has not expired), then the data packet is discarded by the switch or access node. In this case, the data packet is not used in a learning process (i.e. the switch or access node does not update its address-interface mapping table 40 based on the data packet) and the data packet is not forwarded to the destination address 34 specified in the data packet.

The way in which data packets can be inspected for IPv6-related protocol messages in step 101 above to identify the MAC addressed of gateway nodes is described in more detail below.

Gateway node MAC addresses can be determined in the following ways:

from Router Advertisement (RA) messages: every RA message received at the access node from the network side (downstream direction) is analysed in order to acquire its source MAC address and then an entry in the gateway node MAC address table (FIG. 6) is created.

The RA messages can be of two different types:

unsolicited or in response to a solicited message.

When the received RA message is an unsolicited message (addressed to "all-nodes multicast address"), its source MAC address must be valid for all traffic flows. When the received RA message is a response to a solicited request message, its source MAC address must be valid for the single traffic flow and the RA must be sent through.

There is a third option: when an RA message is tunnelled (due to Line Identification Option (LIO) feature enable), the tunnel must be previously removed and then the RA message must be analysed. Information coming from the tunnel and the carried RA message is referred to the specific user the tunnel has been created for.

from DHCPv6 messages: every DHCPv6 ADVERTISE, REPLY and RELAY-REPLY message received from network side (downstream direction) is analysed in order to acquire its source MAC address and then an entry in the gateway node MAC address table (FIG. 6) is created.

from Neighbour Advertisement (NA) messages: advantageously, every NA message received from network is analysed in order to check if the 'router flag' is set or not. In case the router flag is set, the NA message's source MAC Address corresponds to a default gateway's link-layer address and then an entry in the gateway node MAC address table (FIG. 6) is created.

from Internet Control Message Protocol (ICMPv6) redirect messages: advantageously, every IPv6 redirect message received from network side (downstream direction) is analysed. Two possible conditions could occur:

the 'target link-layer address' option is present; in this case this value is the default gateway's MAC address and then an entry in the gateway node MAC address table (FIG. 6) created.

the 'target link-layer address' option is not present; in this case the user receiving the ICMPv6 redirect message will originate a Neighbour Solicitation (NS) message in order to obtain the default gateway's link layer address and the access node will acquire it analysing the NA sent as a reply to the NS. As stated in the previous bullet, the NA message received must be checked in terms of 'router flag': the router flag must be set; otherwise the node is not to be considered a router.

from manual configuration: the system administrator configures, for each traffic flow, a list of IPv6 addresses (not a range) for the allowed default gateway's IPv6 addresses. After the configuration, the access node must originate NS messages (two for reliability purpose) for each default gateway's IPv6 addresses in order to obtain their MAC addresses. Each of these NS must be sent tagged with the virtual local area network (VLAN) configured on the 'ipv6 traffic flow'. As stated above, the NA message received in reply to the NS, must be checked in terms of 'router flag': if the router flag is set, the source MAC address is considered the default gateway's MAC address, otherwise the access node does not consider the source MAC address.

Advantageously, none of the message handling described above affects or interferes with the forwarding process. This means that after being analysed by this method, the data packets/messages must respect the expected forwarding process.

As described above, the learnt gateway node addresses can be stored in a table 50, which can be indexed per gateway node MAC address 52. Each of the entries of the table can be characterised by a 'lifetime' value 54. There are different possibilities for obtaining the 'lifetime' value:

if the method used for acquiring the gateway node's MAC address uses "RA messages", then the lifetime can be obtained from router lifetime field;

if the method used for acquiring the gateway node's MAC address uses "DHCPv6 messages", then the lifetime can be obtained from "lease time" for DHCPv6;

if the method used for acquiring the gateway node's MAC address uses the "NA messages" or "ICMPv6 redirect messages" or "manual configuration", then the lifetime can be obtained from the configured aging time.

Advantageously the access node is not required to implement an IPv6 protocol stack to obtain the gateway node addresses.

An entry in the gateway node address table 50 can be removed if one of the following conditions is met:

no reply to the NS is received by the access node in a period of time, for example 10 seconds; and/or if the NA, sent as a reply to NS, does not carry the "router flag" set.

Although the above explanation only relates to IPv6 protocols, those skilled in the art will appreciate how the method could be applied to DHCPv4 and Point-to-Point Protocol over Ethernet, PPPoE, protocols.

Figure 5:
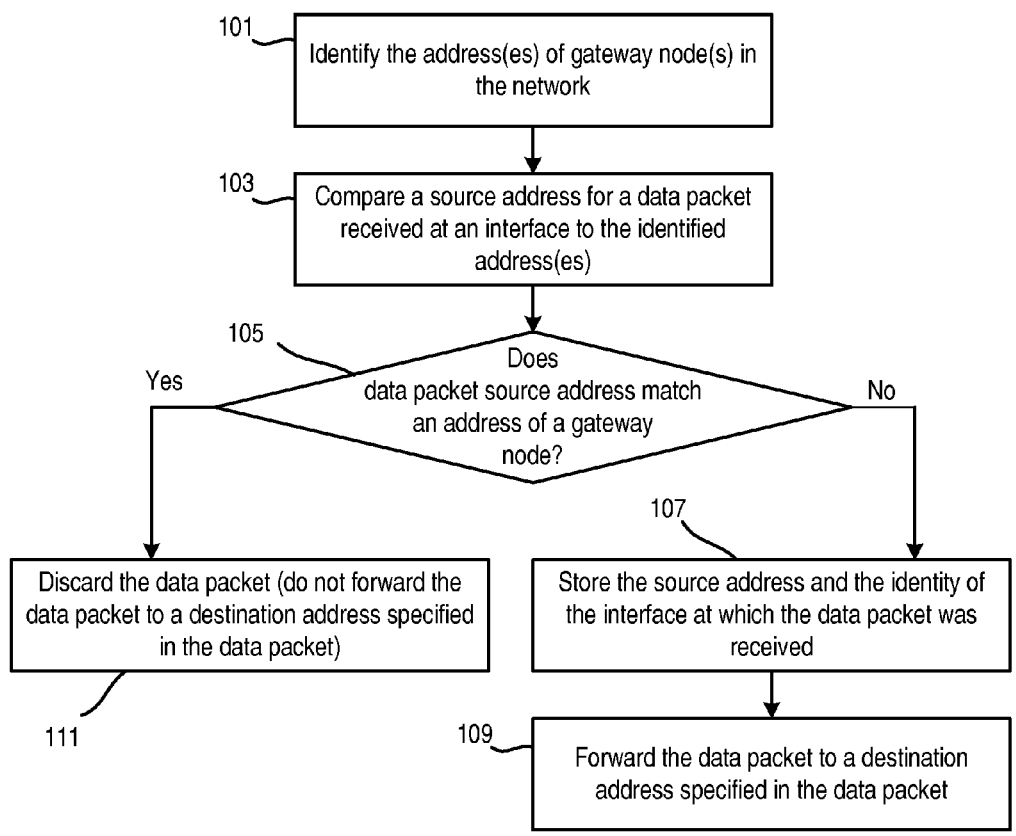
FIG. 5 is a flow chart illustrating a method according to an embodiment of the invention.

It will be appreciated that in networks as shown in FIG. 1, the method should ideally be implemented all of the switches 10 in the Ethernet network 8 order to prevent the user terminals 4 from making use of the address of the gateway nodes 6. However, it will also be appreciated that in networks such as that shown in FIG. 2, it may only be necessary to implement the method in each of the access nodes 20 in the access network in order to secure the network 12 since the access nodes 20 provide access to the network to the user terminals 14. In this case, the switches 22 in the aggregation part of the Ethernet network 18 can be conventional. Alternatively, however, the switches 22 can also be configured to implement the method shown in FIG. 5.

FIG. 7 shows an exemplary processing apparatus according to the invention which may be implemented as any form of a computing and/or electronic device, and in which embodiments of the system and methods described above may be implemented. The processing apparatus can form part or all of a switch 10, 22 or access node 20. The processing apparatus 60 comprises a control unit 62 which may contain one or more processors, microprocessors, controllers or any other suitable type of processors for executing instructions for controlling the operation of the apparatus 60. Processor-executable instructions may be provided using any computer-readable media, such as memory module 64. The memory module 64 may also store the address-interface pairs derived in the learning process (and represented by table 40 in FIG. 4) along with the gateway node address information (and represented by table 50 in FIG. 6). The processor-executable instructions can comprise instructions for implementing the functionality of the described methods. The memory module 64 can be of any suitable type such as read-only memory (ROM), random access memory (RAM), a storage device of any type such as a magnetic or optical storage device. The processing apparatus 60 also comprises network interfaces 66 for interfacing with other network nodes, such as user terminals 4, 14, gateway nodes 6, 16, switches 10, 22 or access nodes 20.

There is therefore provided a method of operating a switch or access node in a network that prevents a user terminal from stealing or making use of the address of a gateway node in the network.

Modifications and other variants of the described embodiment(s) will come to mind to one skilled in the art having the benefit of the teachings presented in the foregoing descriptions and the associated drawings. Therefore, it is to be understood that the embodiment(s) is/are not to be limited to the specific examples disclosed and that modifications and other variants are intended to be included within the scope of this disclosure. Although specific terms may be employed herein, they are used in a generic and descriptive sense only and not for purposes of limitation.

The invention claimed is:

1. A method of operating a switch or an access node in a network, the switch or access node having a plurality of interfaces through which data packets can be received and forwarded, the network further comprising one or more gateway nodes and one or more user terminals, each of the gateway nodes and the user terminals having a respective address, the method in the switch or access node comprising:

learning the address for at least one of the gateway nodes, wherein learning comprises:

inspecting a first data packet, sent by the gateway node and received at the switch or access node, for one or more messages selected from Dynamic Host Control Protocol version 6 (DHCPv6) messages; Neighbor Discovery Protocol (NDP) messages; or Internet Control Message Protocol version 6 (ICMPv6) messages; and in response to determining that the first data packet comprises the DHCPv6, NDP, or ICMPv6 message, storing a first source address specified in the first data packet to a table of learned source addresses for the one or more gateway nodes;

comparing a second source address specified in a second data packet received from a user terminal at one of the interfaces of the switch or access node to the table of learned source addresses for the one or more gateway nodes;

storing the second source address specified in the second data packet and the identity of the interface through which the second data packet was received if the second source address specified in the second data packet does not match the source addresses in the table of learned source addresses for any of the at least one of the gateway nodes; and discarding the second data packet if the second source address specified in the second data packet matches a source address in the table of learned source addresses for any of the at least one of the gateway nodes.

2. A method as claimed in claim 1, the method further comprising the step of:

forwarding the second data packet to a destination address specified in the second data packet if the second source address specified in the second data packet does not match an address for any of the one or more gateway nodes.

3. A method as claimed in claim 1, wherein the step of discarding the second data packet comprises:
discarding the second data packet to prevent forwarding the second data packet to a destination address specified in the second data packet.

4. A method as claimed in claim 1, wherein the step of discarding the second data packet comprises:
discarding the second data packet to prevent storing the second source address specified in the second data packet and the identity of the interface through which the second data packet was received at the switch or access node.

5. A method as claimed in claim 1, wherein the step of learning the address for at least one of the gateway nodes comprises:
storing a source address specified in any data packet identified as having been transmitted by at least one of the gateway nodes as an address of a gateway node.

6. A method as claimed in claim 1, wherein the step of inspecting data packets received at the switch or access node comprises:
inspecting the received first data packets for IPv6 messages.

7. A method as claimed in claim 1, wherein the switch or access node is for use in an Ethernet network, the first and second data packets are each an Ethernet frame and the first and second source addresses are each a media access control (MAC) address.

8. A non-transitory computer program product comprising computer readable code embodied therein, the computer readable code being configured to enable a processor to perform the method steps of claim 1 upon execution of the code by the processor.

9. A processing apparatus for use in a switch or access node in a network, the network comprising one or more gateway nodes and one or more user terminals, each of the gateway nodes and the user terminals having a respective address, the processing apparatus comprising:
a plurality of interfaces through which data packets can be received and forwarded;
a memory module; and
a controller configured to:
learn the address for at least one of the gateway nodes, wherein learning comprises:
inspect a first data packet, sent by the gateway node and received at the switch or access node, for one or more messages selected from Dynamic Host Control Protocol version 6 (DHCPv6) messages; Neighbor Discovery Protocol (NDP) messages; or Internet Control Message Protocol version 6 (ICMPv6) messages; and
in response to determining that the first data packet comprises a DHCPv6, NDP, or ICMPv6 message, store a first source address specified in the first data packet to a table of learned source addresses for the one or more gateway nodes;
compare a second source address specified in a second data packet received from a user terminal at one of the plurality of interfaces to the table of learned source addresses for the at least one of the gateway nodes;
store the second source address specified in the second data packet and the identity of the interface through which the second data packet was received in the memory module, if the second source address specified in the second data packet does not match the source addresses in the table of learned source addresses for any of the at least one of the gateway nodes; and
discard the second data packet if the second source address specified in the second data packet matches a source address in the table of learned source addresses for any of the at least one of the gateway nodes.

10. A processing apparatus as claimed in claim 9, wherein the controller is further configured to:
forward the second data packet to a destination address specified in the second data packet through one of the plurality of interfaces if the second source address specified in the second data packet does not match an address for any of the one or more gateway nodes.

11. A processing apparatus as claimed in claim 9, wherein the controller is configured to discard the second data packet to prevent forwarding the second data packet to a destination address specified in the second data packet.

12. A processing apparatus as claimed in claim 9, wherein the controller is configured to discard the second data packet to prevent storing the second source address specified in the second data packet and the identity of the interface through which the second data packet was received at the switch or access.

13. A processing apparatus as claimed in claim 9, wherein the controller is configured to learn the address for at least one of the gateway nodes by storing a source address specified in any data packet identified as having been transmitted by at least one of the gateway nodes as an address of a gateway node.

14. A processing apparatus as claimed in claim 9, wherein the controller is configured to inspect data packets received at the plurality of interfaces by inspecting the received data packets for IPv6 messages.

15. A processing apparatus as claimed in claim 9 wherein the switch or access node is for use in an Ethernet network, the first and second data packets are each an Ethernet frame and the first and second source addresses are each a media access control (MAC) address.

16. A switch or access node comprising a processing apparatus as claimed in claim 9.

17. A network comprising at least one of a switch or access node as claimed in claim 16.

* * * * *